United States Patent
Overby et al.

(10) Patent No.: US 7,358,738 B2
(45) Date of Patent: *Apr. 15, 2008

(54) METHOD AND APPARATUS FOR DIGITAL DETECTION OF ELECTRONIC MARKERS USING FREQUENCY ADAPTATION

(75) Inventors: Johan D. Overby, Sunnyvale, CA (US); James W. Waite, Los Gatos, CA (US)

(73) Assignee: Metrotech Corporation, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/590,267

(22) Filed: Oct. 30, 2006

(65) Prior Publication Data

US 2007/0040558 A1   Feb. 22, 2007

Related U.S. Application Data

(62) Division of application No. 10/759,747, filed on Jan. 15, 2004.

(51) Int. Cl.
*G01V 3/08* (2006.01)
*G01V 3/11* (2006.01)

(52) U.S. Cl. ............................. 324/326; 324/67
(58) Field of Classification Search ............... 324/326, 324/327, 329, 67, 228, 239, 207.17; 340/572.1, 340/572.4, 572.5
See application file for complete search history.

(56) References Cited

U.S. PATENT DOCUMENTS

| 3,831,173 A | 8/1974 | Lerner |
| 5,512,834 A | 4/1996 | McEwan |
| 5,576,624 A | 11/1996 | Candy |
| 6,362,737 B1 | 3/2002 | Rodgers et al. |
| 6,498,477 B1 * | 12/2002 | Govari et al. .......... 324/207.12 |
| 6,577,238 B1 | 6/2003 | Whitesmith et al. |
| 6,586,938 B1 | 7/2003 | Paltoglou |

(Continued)

FOREIGN PATENT DOCUMENTS

GB   2 247 381 A   2/1992

(Continued)

OTHER PUBLICATIONS

Office action dated Feb. 17, 2006, received in U.S. Appl. No. 10/759,747.

(Continued)

*Primary Examiner*—Reena Aurora
*Assistant Examiner*—Kenneth J Whittington
(74) *Attorney, Agent, or Firm*—Finnegan, Henderson, Farabow, Garrett & Dunner, L.L.P.

(57) ABSTRACT

An electronic marker locator with a digital architecture for providing accurate and consistent estimation of the signal strength is presented. The marker locator includes a Digital Phase-Locked Loop (DPLL) structure. The electronic marker locator transmits known and adjustable frequency bursts corresponding to the markers to be located while synchronously capturing the signals returned from the markers. Because of the convergence properties of the DPLL, very consistent measurements of the reflected marker signal field strength are possible, resulting in both an improvement of maximum detection depth and depth accuracy. Further, the analog front-end hardware can be reduced, offering wider resistance to component tolerances, lower calibration and test times, and flexible frequency selectivity.

21 Claims, 13 Drawing Sheets

U.S. PATENT DOCUMENTS

| | | | |
|---|---|---|---|
| 6,617,856 | B1 | 9/2003 | Royle et al. |
| 6,617,864 | B2 | 9/2003 | Inoue et al. |
| 6,954,072 | B1 | 10/2005 | Schlapp et al. |
| 6,977,504 | B2 | 12/2005 | Wright et al. |
| 7,285,958 | B2 | 10/2007 | Overby et al. |
| 2002/0030492 | A1 | 3/2002 | Yanping et al. |
| 2005/0104595 | A1 | 5/2005 | Nelson |
| 2005/0159929 | A1 | 7/2005 | Overby et al. |
| 2005/0253721 | A1 | 11/2005 | Herring et al. |

FOREIGN PATENT DOCUMENTS

| | | | |
|---|---|---|---|
| WO | WO 2005/071443 | A1 | 8/2005 |

OTHER PUBLICATIONS

Amendment and Response to Office action dated Jul. 17, 2006, filed in U.S. Appl. No. 10/759,747.

Final Office action dated Aug. 29, 2006, received in U.S. Appl. No. 10/759,747.

Amendment After Final dated Oct. 30, 2006, filed in U.S. Appl. No. 10/759,747.

Final Office Action dated Aug. 29, 2006 in U.S. Appl. No. 10/759,747.

Amendment After Final filed Oct. 30, 2006 in U.S. Appl. No. 10/759,747.

Advisory Action Before the Filing of an Appeal Brief dated Nov. 22, 2006 in U.S. Appl. No. 10/759,747.

Office Action dated Jan. 10, 2007 in U.S. Appl. No. 10/759,747.

Response to Office Action filed May 10, 2007 in U.S. Appl. No. 10/759,747.

Notice of Allowance mailed Jun. 8, 2007, in U.S. Appl. No. 10/759,747.

International Preliminary Report on Patentability issued Jul. 17, 2006, in PCT Application No. PCT/US2005/000005.

* cited by examiner

CASE 1

CASE 2

CASE 3

METHOD AND APPARATUS FOR DIGITAL DETECTION OF ELECTRONIC MARKERS USING FREQUENCY ADAPTATION

This application is a divisional application claiming priority to U.S. patent application Ser. No. 10/759,747, filed on Jan. 15, 2004, which is herein incorporated by reference in its entirety.

BACKGROUND

1. Field of the Invention

The present invention is directed toward detection of concealed electronic markers that are commonly buried alongside pipes or cables and, in particular, to a digital implementation of a combined pipe and cable locator device to simultaneously search for buried markers with high accuracy and repeatability.

2. Discussion of Related Art

Utility conduits are often buried underground or concealed in walls and therefore are not readily accessible or identifiable. It is often necessary to locate these concealed utility conduits in order to repair and replace them. It is also important to know the location of utility conduits in order to avoid them while excavating an area. Examples of hidden utility conduits include pipelines for gas, sewage, or water and cables for telephone, television, or power.

There are various ways to locate concealed objects, for example, using line locators or marker locators. Line locators are appropriate when seeking electrically conductive objects, such as metallic pipelines and cables. Line locators may also be used for finding non-electrically conducting conduits when the conduit is marked with a conducting trace wire or trace tape buried along the conduit. The process of applying an AC signal to the conductor at an accessible point and detecting the resulting electromagnetic radiation is well known in the art. When an AC signal is applied, the conductor acts as an antenna radiating an electromagnetic field along its entire length that can be detected by a line locator.

In such an application, a line locator used above ground detects electromagnetic emissions from conductors underground. A disadvantage with relying solely on the line locator device is that it may fail to identify and distinguish among various types of utility conduits and conductors. Additionally, line locator devices cannot be used to locate non-conductive lines, such as, for example, gas lines, fiber optic lines and plastic water lines when those non-conductive lines are not marked with trace wires.

Conduits may also be marked with electronic markers, either at surface level or underground. Buried electronic markers may be used to locate and identify a number of concealed objects such as cables, pipes, access points, underground stock piles, survey points and septic tanks. Typically, marker locators locating passive, active, or smart markers generate an electromagnetic field that induces a response in the marker that can be monitored by a detector of the marker locator. Again, significant difficulty in marker type identification and depth determination may result, especially if multiple markers of differing types and depths are present.

A recent development is disclosed in U.S. Pat. No. 6,617,856 B1, which describes a DSP based marker locator that substantially reduces detection inaccuracies attributed to analog mixers, antenna saturation, and DC offsets common in many designs. A quadrature mixer and IIR adaptive filter are used to modify the integration (averaging) time of the system to enhance performance when the markers are deeply buried, and to allow a more responsive mode (shorter averaging times) when this is not the case.

It is desirable in such marker detection systems that the results be repeatable and accurate. Therefore, methods of detecting the maximum reflected signal strength of a marker at a certain depth are important. It is also important that marker locators determine with a high degree of accuracy the particular type of marker that is present. Therefore, there is a need to develop more highly accurate and reliable systems for detecting marker types and marker depths.

SUMMARY OF THE INVENTION

In accordance with the present invention, a marker locator receiver digital architecture is described that provides for digital marker and line location. In this fashion, highly accurate identification of marker type and depth determination can be accomplished.

A marker locator according to some embodiments of the invention includes at least one transmitter channel coupled to an electromagnetic field generator, at least one receiver channel coupled to an electromagnetic field detector, and a digital processor coupled to provide signals to the at least one transmitter channel and to receive signals from the at least one receiver channel. In the marker locator, the digital processor receives signals from the at least one transmitter channel between application of signals to the at least one transmitter channel, the digital processing system averaging signals received from the at least one receiver channel to determine signal strength and the frequency of signals received.

A method of locating one or more markers according to some embodiments of the invention include generating a series of electromagnetic pulses, receiving signals as a function of time between application of the pulses, averaging the signals over a predetermined number of pulses to obtain an average decay signal, initially determining a frequency, field strength, and phase for responses from the one or more markers, determining the frequency, field strength, and phase more accurately, and refining the electromagnetic pulses in order to provide resonant frequencies for each of the pulses.

Additionally, in some embodiments a dual-mode locator that simultaneously offers both line and marker location methods is presented. Using such embodiments, an operator using conventional line tracing methods (with a separate transmitter to directly or inductively couple the signal at an access point) can also be warned of the presence of one or more electronic markers in the same vicinity. Furthermore, in some embodiments multiple marker types can be searched for simultaneously, and the user can be alerted to the presence of each marker type as encountered. When ambiguities in marker type and signal strength exist due to a "neighbor detection" or "near-far" problem, it is advantageous for a marker locator to be able to reliably discriminate targeted marker types from others using a quantitative method. During the search phase of marker location (for example, a background marker search activity while in line-locate mode), a frequency adaptation mechanism can be included to create the highest possible signal-to-noise ratio (SNR) in the reflected marker signal response. Finally in the lock phase, when an individual marker is known and locked onto by the marker locator, accurate and repeatable signal strength estimates can be attained prior to invoking a depth calculation.

These and other embodiments are further discussed below with reference to the following figures.

In the figures, elements having the same designation have the same or similar functions. Elements in the figures are not drawn to scale.

DESCRIPTION OF THE EMBODIMENTS

Generally, electronic markers consist of two types, namely, active markers and passive markers. Active markers radiate a signal detectable at the surface; however, they require a power source. Passive markers, on the other hand, require no power source and become active when induced by an external electromagnetic field, which can be generated with a portable power source.

A marker locator is a device for detecting and determining the location of concealed or buried markers. Passive markers typically include a multi-turn wire loop (coil) tuned with a capacitor to a pre-determined resonant frequency. A flexible implementation of an electromagnetic marker locator is described in U.S. patent application Ser. No. 10/227,149, "Procedure and Device for Determining the Location of Buried Electronic Markers," by Hubert Schlapp and Richard Allin, which is herein incorporated by reference in its entirety. A fully digital implementation of an electromagnetic line locator is described in U.S. patent application Ser. No. 10/622,376, "Method and Apparatus for Digital Detection of Electromagnetic Signal Strength and Signal Direction in Metallic Pipes and Cables", by James W. Waite and Johan D. Överby, which is herein incorporated by reference in its entirety.

Figure 1:
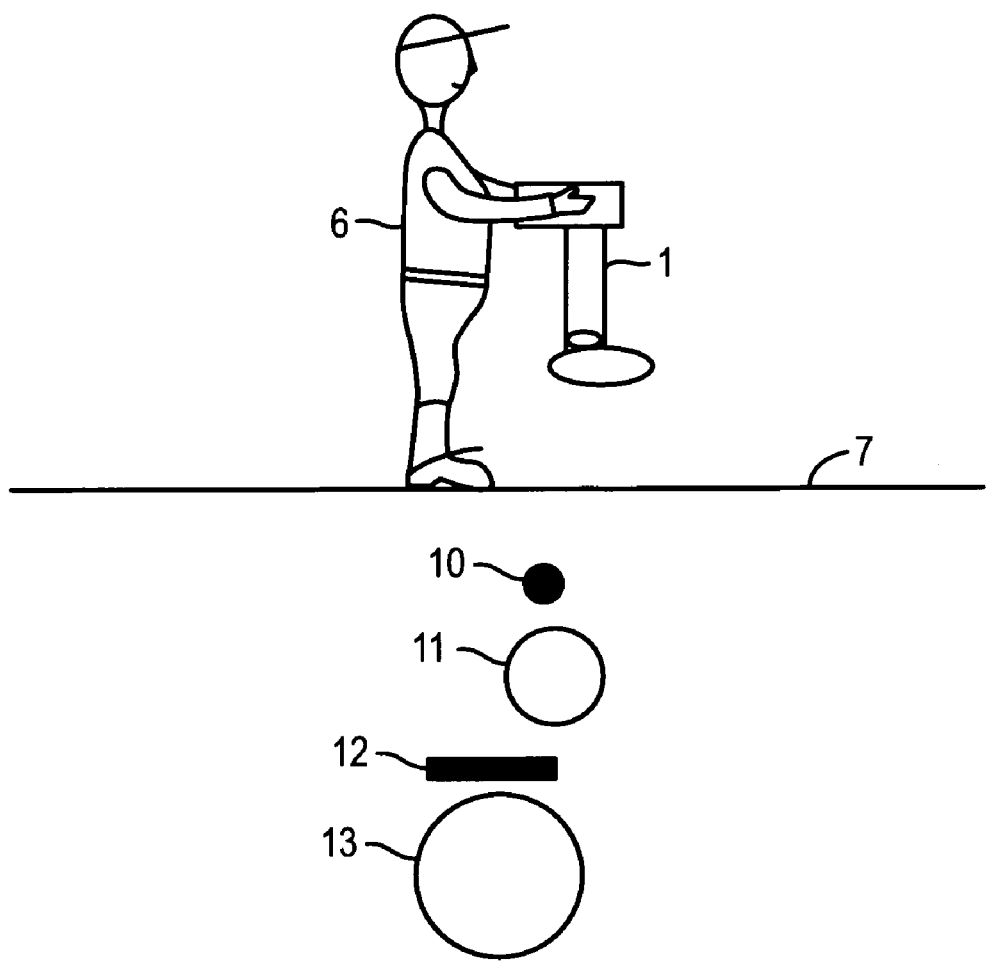
FIG. 1 illustrates a marker locator in operation by a location technician.

FIG. 1 illustrates a marker locator according to the present invention as operated by a location technician 6. Location technician 6 holds marker locator 1 directed towards ground level 7 to find the location of hidden passive markers 10 and 12. The hidden passive markers 10 and 12 can each be coded with a resonant frequency in order to identify the type of utility lines 11 and 13 that each frequency respectively marks.

Commonly, a passive marker is the combination of a wire coil and a capacitor enclosed within a non-metallic protective enclosure. The combination creates an inductance-capacitance (LC) circuit defined by an inductance developed by the wire coil and a capacitance held by the capacitor. The LC circuit operates in a resonance mode at its resonant frequency $f$ given by the equation:

$$f = \frac{1}{2\pi\sqrt{LC}} \quad \text{(Equation 1)}$$

where L is the inductance of the wire coil and C is the capacitance of the capacitor.

Figure 2A:
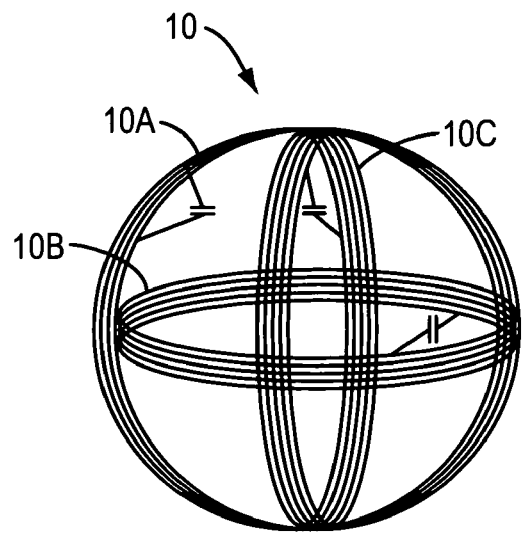
FIG. 2A shows an example of a ball-type passive marker.

FIG. 2A shows an example of a ball-type passive marker. Passive marker 10 is a spherical passive marker housing three LC circuits 10A, 10B, and 10C. The coils of each LC circuit 10A, 10B, and 10C are positioned in orthogonal Cartesian planes such that the three tuned circuits produce a uniform radio frequency (RF) field.

Figure 2B:
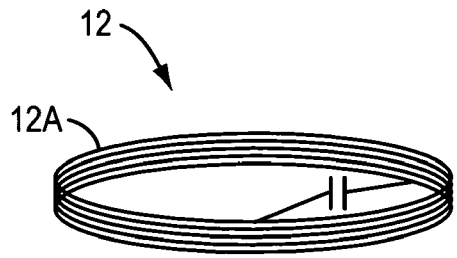
FIG. 2B shows an example of a disk-type passive marker.

FIG. 2B shows a disk-type passive marker. Passive marker 12 is a flat passive marker housing a single LC circuit 12A with the coil positioned in the horizontal X-Y plane.

Figure 3:
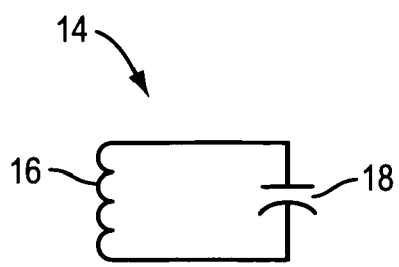
FIG. 3 shows the electrical schematic diagram for a single LC circuit of a passive marker.

FIG. 3 shows the electrical schematic diagram of a single LC circuit. The coil acts as an inductor 16, and is connected in parallel with a capacitor 18 to form a resonant tank circuit 14. The frequency $f$ of the passive marker is set by the resonant frequency of the passive LC circuit, which can be tuned to a preset value.

Different types of utility lines are each associated with unique resonate frequency values. Markers with different resonant frequencies may also be colored for quick identification when installed. Six distinct frequency/color combinations are commonly used: 77.0 kHz (Orange/Black) for Canadian telephone and Cable TV; 83.0 kHz (Yellow) for Gas; 101.4 kHz (Orange) for Telephone; 121.6 kHz (Green) for Sanitary/Waste water; 145.7 kHz (Blue) for Water; and 169.8 kHz (Red) for Power. Of course, these frequencies (and colors) have been designated by conventional use and are not meant to be restrictive.

Though passive electronic markers have several advantages over tracing wires, they are still subject to detection ambiguities. U.S. application Ser. No. 10/227,149 (Schlapp, Allin) discloses methods of scanning for multiple marker types, with the goal to reduce the time consumed by separate searches for each type of marker, or to provide alerts for the presence of non-targeted markers. Additional search techniques are presented with the aim of mitigating the "neighbor detection" problem where emissions of marker-types not being searched for overwhelm the receiver producing false-positive indications, and the "near-far" problem where emissions from nearby markers can override signals from the farther placed marker possibly producing an erroneous marker indication. U.S. application Ser. No. 10/227,149 further discloses methods of sequentially testing for the presence of adjacent markers and using the measured signal levels to deduce whether or not targeted markers may be obscured by the "neighbor detection" or "near-far" problems.

U.S. patent application Ser. No. 10/227,149 discloses the possibility of invoking a parallel search method in which multiple marker types can be excited by a single transmitter pulse. Specific detection methods are discussed below that allow discrimination of specific marker types from the collective marker response to such a transmit signal.

Optimized accuracy of measuring both the marker type and depth can be achievable where the marker LC circuit is repeatedly stimulated at a frequency that is precisely matched to the natural frequency of the marker. In Equation 1, the marker natural frequency $f$ is subject to manufacturing tolerances in the inductive and capacitive elements, thus can vary from marker to marker (of the same type) by a few kHz. A marker signal strength detection device, then, should include some adaptation or search mechanism for finding the natural resonant frequency of a marker in order to increase accuracy of measurement. Once the natural frequency is determined for a specific electronic marker, a consistent measure of the signal strength is attainable at the best possible signal-to-noise ratio (SNR).

Figure 4A:
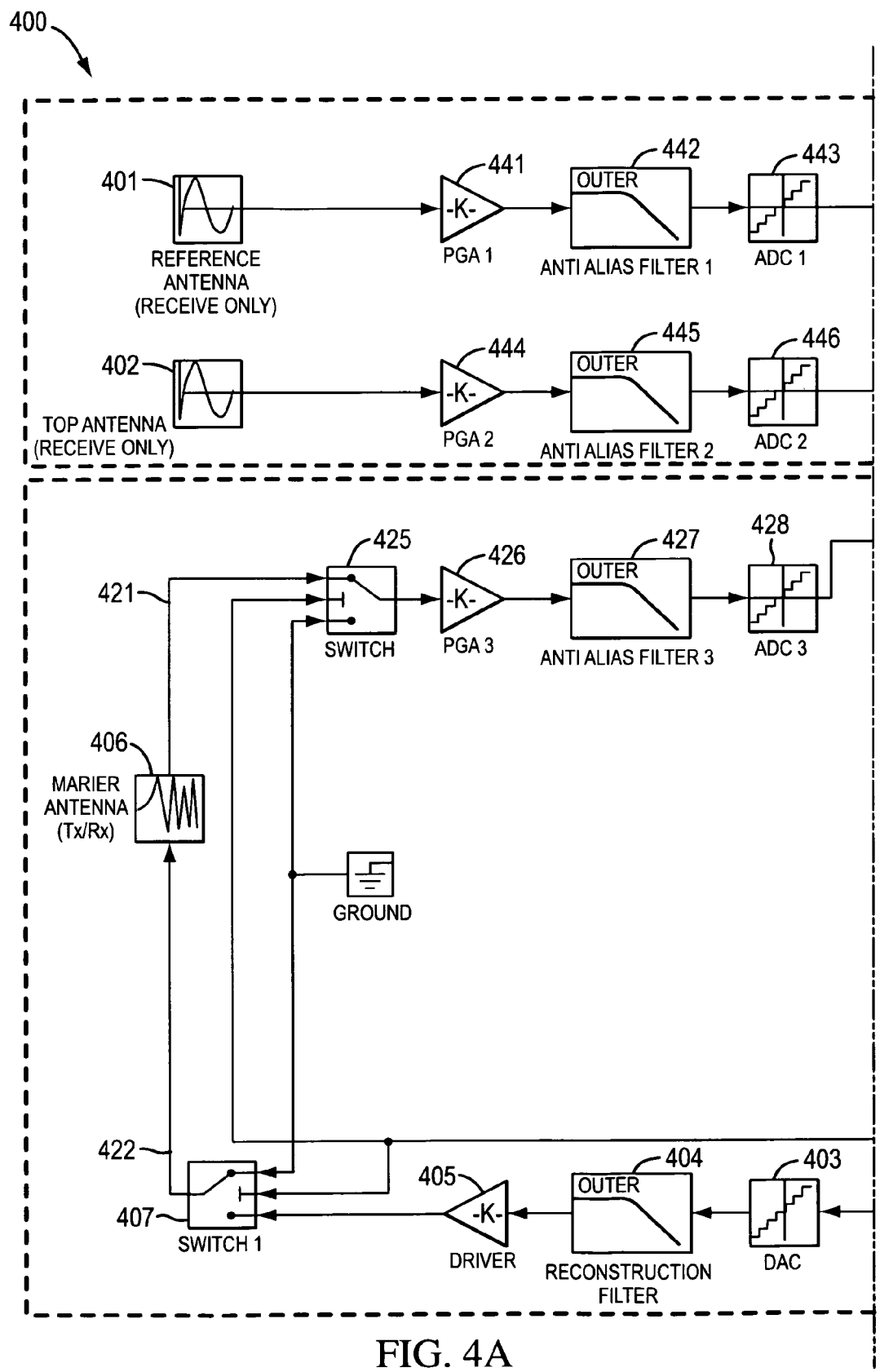
FIG. 4 shows a block diagram of an embodiment of a combined line and marker locator according to the present invention.
Figure 4B:
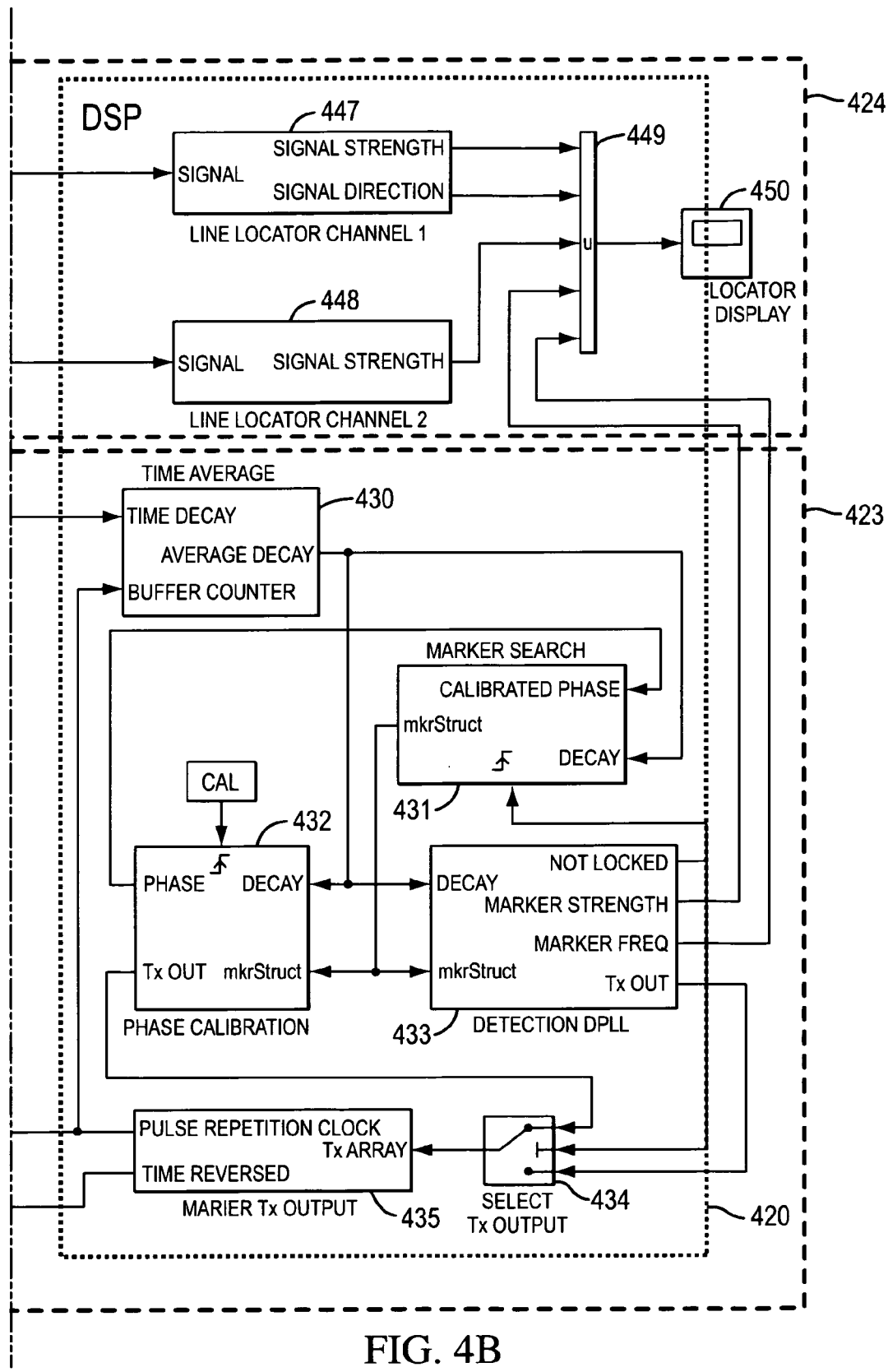

A block diagram of a combined marker and line locator 400 according to some embodiments of the present invention is shown in FIG. 4. Locator 400 includes a line locator section 424 and a marker locator section 423. In the embodiment shown in FIG. 4, the top two data paths that originate from the reference antenna 401 and top antenna 402 are associated with a simple peak-mode line locator 424. The signal detected by reference antenna 401 can be processed through an amplifier 441 and a filter 442 before being digitized by analog-to-digital converter (ADC) 443. Similarly, the signal detected by antenna 402 can be processed through amplifier 444 and filter 445 before being digitized by ADC 446. The digital signals from ADC 443 and ADC 446 are input to a processor 420. The signal from ADC 443 is received by channel processor 447 and the signal from ADC 445 is received by channel processor 448. Channel processors 447 and 448 determine signal strengths and signal directions, which can be displayed on locator display 450 through interface 449. In some embodiments, processor 420 may include a microprocessor or microcontroller executing software for performing the functions of processor channels 447 and 448. Measurements of signal strength from antennas 401 and 402, which are typically separated vertically by a known amount, allow calculation in processor 420 of conductor depth and the current through the conductor. In accordance with the present invention, any line locator structure may be included in line locator 424. For example, a line locator with left/right indication is disclosed in U.S. Pat. No. 6,407,550, issued on Jun. 18, 2002 to Parakulam et al. and assigned to the same assignee as is the present disclosure, which is herein incorporated by reference in its entirety.

Marker locator section 423 according to some embodiments of the present invention includes an antenna 406 coupled to receive a transmitter output signal 422 and a receiver input signal 421. Marker locator section 423 is capable of transmitting electromagnetic radiation through marker antenna 406 at one or more of a plurality of fixed frequencies. Further, receiver input signal 421 can include signals detected by marker antenna 406 at one or more of a plurality of fixed frequencies. Marker locator 423 further includes a processor 420 coupled to receive the receiver input signal 421 for analysis and to generate the transmitter output signal 422.

In some embodiments, processor 420 can include a fixed-point digital signal processor (DSP). In such a DSP, most if not all marker specific signal generation and detection algorithms can be implemented in software. Further, some or all of the functions of line locator section 424 can be performed by the DSP of processor 420. Receiver input signal 421 is input to switch 425. When switch 425 is engaged to recognize receiver input signal 421, receiver input signal 421 is then amplified in amplifier 426, filtered in filter 427, and digitized in ADC 428 before being input to processor 420. Additionally, transmitter output signal 422, digitally generated by processor 420, is input to digital-toanalog converter 403, filtered in filter 404, and amplified in amplifier or driver 405 before being received by switch 407. When switch 407 is engaged, transmitter output signal 422 is applied to marker antenna 406. In some embodiments, filters 427 and 404 can both be low-pass filters. Filter 427 then acts as an anti-aliasing filter while filter 404 acts as a reconstruction filter.

As shown in FIG. 4, the only hardware in marker locator section 423 are the analog filters, amplifiers, and switches that control signals arriving at or coming from marker antenna 406. In addition, line locator receiver section 424 also includes amplifiers and filters. Thus, marker locator section 423 according to the present invention results in significantly reduced analog front-end hardware requirements, a wide resistance to component tolerances, lower calibration and test time, and flexible frequency selectivity. Marker locators according to embodiments of the present invention provide accurate and consistent estimation of the electronic marker signal strength in extremely noisy environments.

As is shown in FIG. 4, processor 420 receives receiver input signal 421 into a time average block 430. Time average block 430 synchronously averages the signals received at periodic intervals upon repeated application of the transmitter output signal 422 to marker antenna 406. As such, time average 430 can measure the time delay of the returned pulse with lower noise than without the average function. The output signal from time average 430 is input to marker search block 431. Marker search block 431 uses frequency domain methods to extract signals in the time average signal 430 that correspond to particular marker types. When locked, phase calibration 432 and detection DPLL 433 have identified the resonant frequency of a marker and can output the resonant frequency and the return signal strength for display on locator 450. Additionally, the frequency generated either by phase calibration 432 or by detection DPLL 433, selected in switch 434, is input to marker transmitter output generator 435, which generates digitally the transmitter output signal 422. Therefore, processor 420 locks marker locator 423 onto one or more frequencies corresponding to the resonant frequencies of one or more markers that are being simultaneously detected in receiver input signal 421.

Much of the performance improvement achieved in some embodiments of the present invention is primarily due to the frequency adaptation and selectivity resulting from a set of digital phase locked loops (DPLLs) implemented in detection DPLL 433. In some embodiments, detection DPLL 433 can include one DPLL for each marker type being simultaneously tracked. The tracking algorithm supports a successive detection process wherein markers that are buried deeper and whose signal may be obscured by shallower markers of a different type are exposed through cancellation of the stronger signals of the identified markers.

Each digital phase-locked loop in detection DPLL 433 can be a first order phase-locked loop that adapts only the frequency of a numerically controlled oscillator (NCO). There is no phase adaptation since this is known and deterministic, based on the repeated output signal from a synchronous transmitter pulse of transmitter output signal 422. In some embodiments, the DPLL frequency update is performed only once per averaged time decay from block 430 (corresponding to the time between successive pulses of transmitter output signal 422). The procedure of updating the frequency only once per pulse period of transmitter output signal 422 represents a significant reduction in the amount of data to be processed through the DPLLs. In some embodiments, data processing in processor 420 may be reduced by a factor of between 10 and 500 (depending on the pulse repetition rate). Therefore, in some embodiments the number of DSP instruction cycles utilized in the processor 420 in each cycle can be minimized. Each DPLL frequency update is represented in a new output frequency block that is combined together by superposition in block 435.

In some embodiments, when multiple marker types are detected in marker search 431 a power control algorithm can be implemented to enhance the process of successive cancellation of stronger marker signals and thus help mitigate the near-far problem. The near-far problem occurs when signals from marker types that are adjacent in frequency to a targeted marker appear as if they originated from the targeted markers. The most common example is when a marker closest to the transmitter (shallowest in the ground) overpowers a targeted marker because their respective resonant frequencies are similar. Because signal power drops exponentially with distance and the marker frequency response is relatively broad (as per the first order LC filter characteristic of the typical marker), the wrongly-identified nearer marker can completely hide the targeted farther marker. Embodiments of the present invention allow adjustment of the transmitted signal power between the targeted marker type and the adjacent markers in order to support removal of the energy signal originating from the adjacent marker by successive cancellation of that energy from the received signal.

Another reason to implement power control is battery life—if the transmitter were to continuously transmit at a power higher than that needed to maintain an acceptable SNR, the battery lifetime can be greatly reduced. Using a combination of power control and modification of the transmitted signal burst rate, the marker locator may transmit using the minimum power needed for maintaining the required SNR ratio, thus conserving its battery life.

In some embodiments, the reflected signal power levels of each marker reaching the receiver undergo constant changes because of persistent operator movement of the marker locator with respect to the ground. The signal processing problem that the changing power levels represents is compounded by the growing use of multiple marker types to tag utilities within the same physical location (leading to instances of the near-far problem). To overcome these obstacles, real-time tracking of multiple marker types using digital phase locked loops, as well as power control, can be utilized. In some embodiments of the invention, as described in the specification, both the frequency and amplitude of the marker search signals can be adapted to optimize the detection of multiple marker types while avoiding many of the neighbor detection ambiguities prevalent in prior art marker locators.

In some embodiments of the present invention, a consistent signal strength measurement is maintained to provide the maximum possible SNR. This arrangement can be achieved because the DPLL locks to the natural resonant frequency of the marker. An increased confidence in the indications of depth and position provided by the marker location system can therefore be achieved.

Marker locator transceivers, such as marker locator section 423 of locator 400, transmit known and adjustable frequency bursts while synchronously capturing the signals reflected from the markers. In the embodiment illustrated in FIG. 4, the output signal bursts are created in transmitter output signal generator 435. For a simple search involving only one type of marker, the initial output signal passed to DAC 403 is a single sinusoidal tone at the nominal marker frequency (e.g., 101.4 KHz for telephone cable markers). DAC 403 is also capable of transmitting a marker excitation signal combined by superposition that stimulates multiple markers simultaneously. In some embodiments, an important constraint is placed on the transmitter output signal—the phase of the output burst is set such that the beginning of the input block after ADC sampling in the receiver is defined as zero degrees for each marker stimulus frequency. Therefore, the digital phase locked loop (DPLL) in the receiver path (i.e., in detection DPLL 433) can create an error signal and tend toward a locked state at zero-phase.

Figure 5:
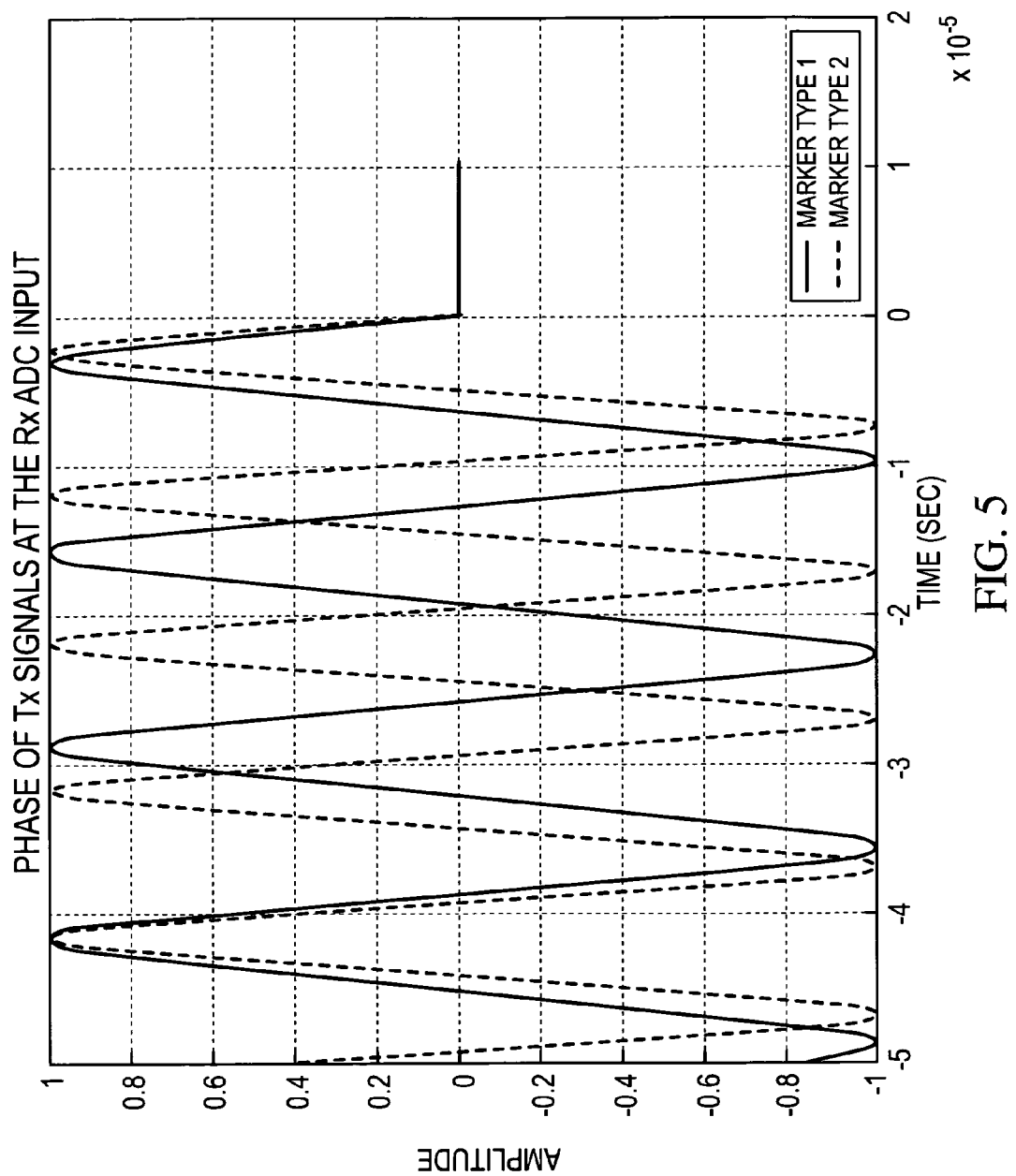
FIG. 5 illustrates an example of the relative phase differences in a superposition of transmit signals from the perspective of a receiver ADC input.

To ensure that correct phase adjustments are made to the transmitted signal, the entire delay chain between DAC 403 and ADC 428 can be characterized by a calibration operation 432. This synchronous stimulus response measurement procedure can be invoked when no markers are present in the environment. The result of the phase calibration operation 432 is that the appropriate group delay can be accounted for in the transmit burst. The tail end of a transmitter burst for two marker frequencies is shown, for example, in FIG. 5, from the perspective of the data sampled at the ADC 428. The phase between the two signals is zero at time zero, corresponding to the first ADC sample of the new burst. Not shown in FIG. 5 is the marker response data that is collected starting at time zero.

Switches 407 and 425 (FIG. 4) limit the "self echo" signal seen in the receive chain that is due to the transmitter directly, rather than indirectly through the marker(s). These switches toggle between ground and signal depending on the phase of the pulse repetition clock 435, with the result that the receiver chain sees ground during the high level output of the transmitter. An instant after time zero (zero phase at the ADC input), the transmitter output is grounded (through an impedance matching resistor), truncating the decaying impulse response of filter 404 and keeping the transmit output signal 422 from impacting the receiver measurement of the marker decay in receiver input signal 421. Even with the switches in place some energy does leak from the transmitter to the receiver, but this leakage energy can be within the limits of the high gain analog circuitry of amplifier 426 and filter 427 to sustain without saturation. The residual self-echo signal is determined by calibration operation 423 and later subtracted from the averaged received marker decay signal.

Some embodiments of the invention allow the simultaneous excitation of multiple marker types, therefore transmitter signal generation 435 uses the calibrated group delay values for each nominal marker center frequency from which to form the output signal superposition. Table 1 below shows an example of the group delay corresponding to a non-linear phase characteristic for one embodiment of the analog anti-alias filter 427. Because of phase dispersion, in FIG. 5 at time zero, the two zero phase marker stimulus signals input to ADC 428 will not have this same phase relationship at the signals output from transmitter DAC 403. Table 1 represents the delays where filter 427 is an $8^{th}$ order Butterworth filter.

TABLE 1

| Marker Type | Frequency (kHz) | Magnitude (dB) | Group Delay (us) |
|---|---|---|---|
| Cable TV | 77.0 | 0 | 4.87 |
| Gas | 83.0 | 0 | 4.93 |
| Telephone | 101.4 | 0 | 5.19 |
| Sanitary | 121.6 | −0.01 | 5.65 |
| Water | 145.7 | −0.15 | 6.73 |
| Power | 169.8 | −1.41 | 8.16 |

During transmitter output generation 435, the group delays can be taken into account for each marker stimulus signal and transmitter output signal 422 can be adjusted accordingly. The easiest way to perform adjustments to transmitter output signal 422 is to generate the signals in reverse time order (starting with the required phase per marker type) at time zero in the receiver. After the entire block is generated for all frequencies, it is fed to the DAC 403 backwards in time from the order of creation. Thus the phase zero reference point is almost the last sent out to DAC 403. In some embodiments, a small number of extra samples can be created after time zero. Typically, the extra samples are approximately equal to the group delay through the signal chain for each marker frequency.

Other embodiments of this invention can utilize higher sample rate ADCs for ADC 428 that allow anti-alias filter implementations that are essentially linear phase in the range of marker frequencies. Yet other embodiments can make use of a delta-sigma ADC 428 and DAC 403 that eliminate the need for external non-linear phase filters given the oversampling inherent in the delta-sigma approach. In any of these other embodiments, the phase calibration task is simplified, but other factors may steer the designer away from them. For example, higher rate ADCs generally require more power, which limits their practical implementation in a battery operated marker locator. Furthermore there is a tradeoff in the number of bits of precision of an ADC with the maximum sample rate. Even so, rapid technology improvements in the communications sector (especially digital subscriber line (DSL) technologies) are driving the development of integrated DAC and ADC devices (codecs) that have compatible bandwidths with that of typical electronic marker detection systems. The DSL hybrid interface to twisted copper pair transmission media, for example, requires a self-echo canceller and can provide a solution to the similar problem mentioned above resulting from the marker transmit/receive antenna 406.

After calibration, in some embodiments using a time division between the transmit pulse and marker response, each and every transmit burst has substantially the same zero phase (independent of marker type or group delay) when referenced at time zero (at the first ADC sample at ADC 428). This key fact can be paired with another regarding the LC circuits that represent the markers: As the excitation frequency increases and crosses the resonance point, the phase response of the marker goes through a 180° positive to negative shift. The phase is substantially zero at resonance. If an excitation frequency composed according to the description above also happens to be exactly equal to the natural frequency of the marker, the phase of the signal at sample zero from ADC 428 will also be zero. Conversely if the excitation frequency is somewhat different from the marker's natural frequency, the phase of sample zero from ADC 428 will not be zero. This leads to the use of the measured marker phase as an error feedback term and a digital phase locked loop to adapt the excitation frequency until the transmitter burst frequency precisely matches the resonant frequency of the marker. In this sense (when other factors are equal), marker locators implemented according to embodiments of the present invention provide signal strength measurements at the maximum possible SNR for a given antenna 406 and amplifier chain (including amplifier 426, filter 427, and ADC 428).

The same applies to the case when multiple marker types are stimulated simultaneously. As described above, a superposition of sinusoidal signals is created at the transmitter output DAC 403, each component of which has zero phase when referenced at ADC 428 input at time zero. Thus multiple independent DPLLs could be implemented in detection DPLL 433 to simultaneously track each type of marker detected in the environment based on the same simultaneous measurement. In practice, the resonant responses of the various marker types generally overlap in frequency, so a more complex successive cancellation scheme can be implemented, as is further described below.

The signal processing steps necessary to implement the frequency adaptation algorithm are now described. Although many of the algorithms are described in this disclosure with references to block diagrams, the algorithms can be implemented in software, hardware, or in some embodiments a combination of software and hardware. In some embodiments, algorithms described in this disclosure can be implemented on an integrated circuit. The integrated circuit can include a microprocessor and memory to perform any or all of the functions described in this disclosure. Further, the integrated circuit may include dedicated circuitry for performing some or all of the functions described here.

A series of repetitive transmit pulses are captured at the receiver. A typical pulse repetition rate for some embodiments of the present invention is between 500 and 1000 per second, with a duty cycle of 25-50% (250 µs to 1 ms transmit burst time). By convention the parameter k is defined to represent the index of the transmit pulse since the last frequency change, while j defines the index of the ADC sample within any pulse k. By this definition j=0 at time zero of the $k^{th}$ pulse (coincident with the first ADC sample from ADC 428). Then, according to some embodiments of the present invention, the marker locator includes a time-domain averaging block 430 that enhances the coherent signal strength of the marker(s) while significantly reducing the random noise.

Figure 6:
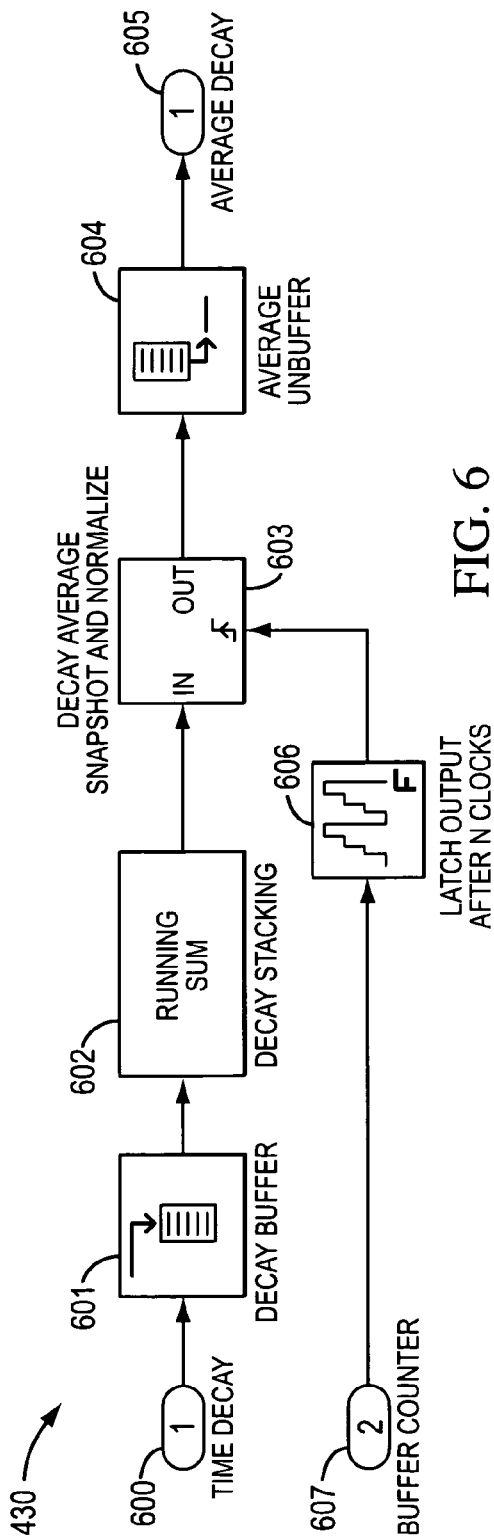
FIG. 6 shows a block diagram of an embodiment of a time average calculation used to estimate the marker response signal according to the present invention

FIG. 6 shows a block diagram of time averaging block 430 according to some embodiments of the present invention. A time decay signal 600 and a buffer counter signal 607 can be received into time averaging block 430. Time decay signal 600, as can be seen from FIG. 4, is the sampled output signal from ADC 428. Buffer counter signal 607 is the pulse repetition clock signal from marker transmit output 435 and represents the signal for successive application of transmit output signal 422 to marker antenna 406.

In the embodiment shown in FIG. 6, time decay signal 600 is input to decay buffer 601. A running sum of the time decay signals after each pulse can then be averaged in running sum block 602. Decay buffer 601 buffers a selected number of samples corresponding to the length of the marker signal envelope decay after application of a pulse to marker antenna 406 and receipt of the return signal at marker antenna 406. The values stored in decay buffer 601 are summed in running sum 602. Running sum 602 performs a selected averaging method, where the averaging method can be either linear (unweighted sum over all pulses x(k)) or exponential (a first order recursive sum of the form y(k+1)= (1−A)x(k)+Ay(k), where A can be on the order of 0.99 in time averaging block 430). Latch output 606 latches latch 603 after receipt of N clock pulses, indicating that N transmit output pulses have been applied to marker antenna 406. After N pulses, the averaging sum compiled in running sum 602 is latched in latch 603 and provided to buffer 604 for serial output at average decay signal 605. As is apparent, but not shown in FIG. 6, timing is performed utilizing a system clock that is much faster than the rate of pulses.

The average time N that triggers latch output 606 into latching latch 603 can be defined as either the number of pulses that are linearly averaged together (linear average) or the number of pulses moved through the recursive sum (exponential average). In either case, after N transmitter pulses received, a normalized and averaged decay block is the output from time averaging block 430. The length of the block in samples, i.e. the depth of buffers 601 and 604, is sufficient to capture the entire decay of the marker(s) to the now lower noise floor, due to coherent averaging. This depth can correspond to the entire time between successive transmitter pulses. In some embodiments, the linear average is reset to zero after N pulses, which is usually at the time of a frequency update to the transmit block. In some embodiments, exponential averaging is not reset.

Figure 15:
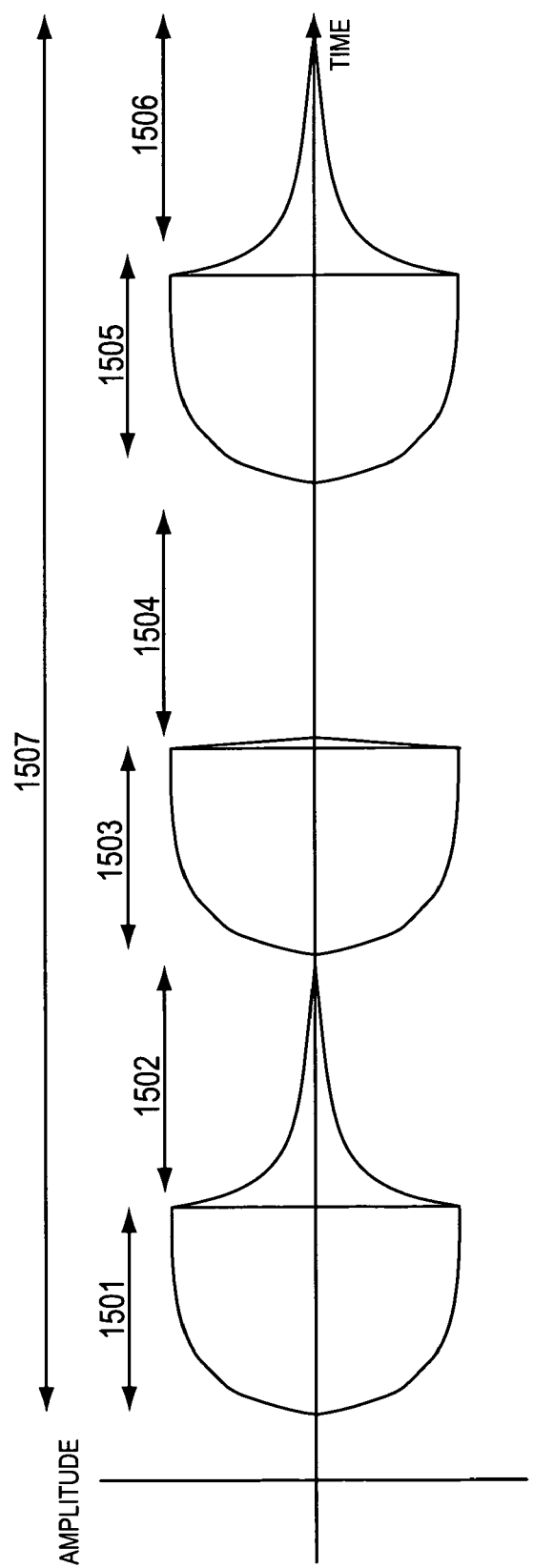
FIG. 15 illustrates a pulse stream and response in an embodiment of a marker locator system according to the present invention that detects a smart marker.

Some electronic markers may have memorized information (serial numbers, user data, position information) that is encoded into the marker decay response to the transmit burst. In one such example of a "smart marker", the logic zero level can be represented by the absence of a marker response to a transmit burst and the logic one is represented by a normal response to the transmit burst. In other words, the smart marker chooses to blank its own response or not based on the information stream to be sent to the surface. The above ground marker locator detects this bit stream by detecting the presence or lack thereof of a marker response per each transmit burst. It is still useful to enhance the coherent signal strength of the smart marker by averaging, but the presence or absence of the marker response utilize a more sophisticated averaging scheme. Since the marker locator at the surface has a priori knowledge of the length of the data packets sent to it in the form of on or off marker responses, an array of average buffers could be allocated to form one decay response average per bit. For example, as in FIG. 15, if the data packet consists of 3-bits, then the marker locator receiver would allocate 3 time average buffers that allow capture of the entire sequence of three marker stimulus/responses 1507. Then a repeated command of the smart marker to reply with the same binary data packet could be averaged into an array of three buffers using the method described above. Each averaged buffer then will result in a higher SNR per data bit than would be achievable without time averaging of the marker decay response. In this example, decay responses 1502, 1504, and 1506 (in response to stimuli 1501, 1503, and 1505) are decoded after averaging to represent the binary sequence "1-0-1".

Figure 7:
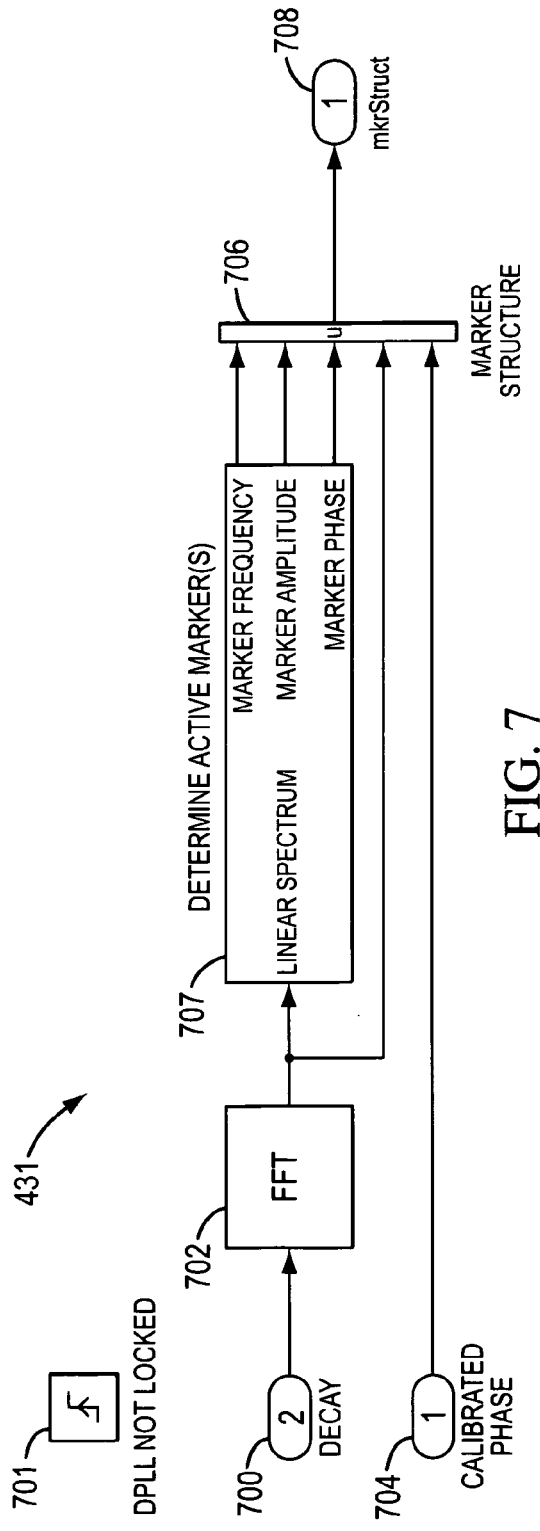
FIG. 7 shows a block diagram of an embodiment of a frequency domain operation that can be invoked on the averaged decay response to determine which marker types are likely active in a current search.

The averaged decay output signal 605 is then input to marker search block 431, a block diagram of an embodiment of which is shown in detail in FIG. 7. In FIG. 7, the averaged decay output signal 605 is depicted as decay signal 700. Marker search block 431 is enabled only if the enable bit "DPLL not locked" 701 is true. This enable signal is generated in Detection DPLL 433 and is further discussed below. Marker search block 431 determines whether a marker or set of markers may be present in the environment, and forms a marker structure 708 (or possibly an array of structures when multiple marker types may exist) for use in the remainder of the detection algorithm. The key information captured in marker structure 708 is the marker frequency, phase at that frequency, and amplitude. When the DPLL is locked, structure 708 is already initialized, and block 431 need not execute.

Marker search block 431 receives the time average signal from time average block 431 as decay signal 700. Decay signal 700 is received in fast-Fourier transform 702 that performs a linear Fourier transform function on decay signal 700. The results of the Fourier transform are input to a determine active marker block 707 and may be output as part of marker structure signal 708. Initially, the marker frequency, phase, and amplitude can be derived from a thresholding operation on the output signal from linear FFT 702 of the time averaged signal 700. A good indicator of the presence of one or more marker types results from the extraction of peaks from the spectrum that are close to the nominal marker center frequencies. Amplitude and phase information are taken from the FFT result and written to the marker structure 706. The calibrated phase offset at that frequency is also carried along in marker structure 706.

Figure 8:
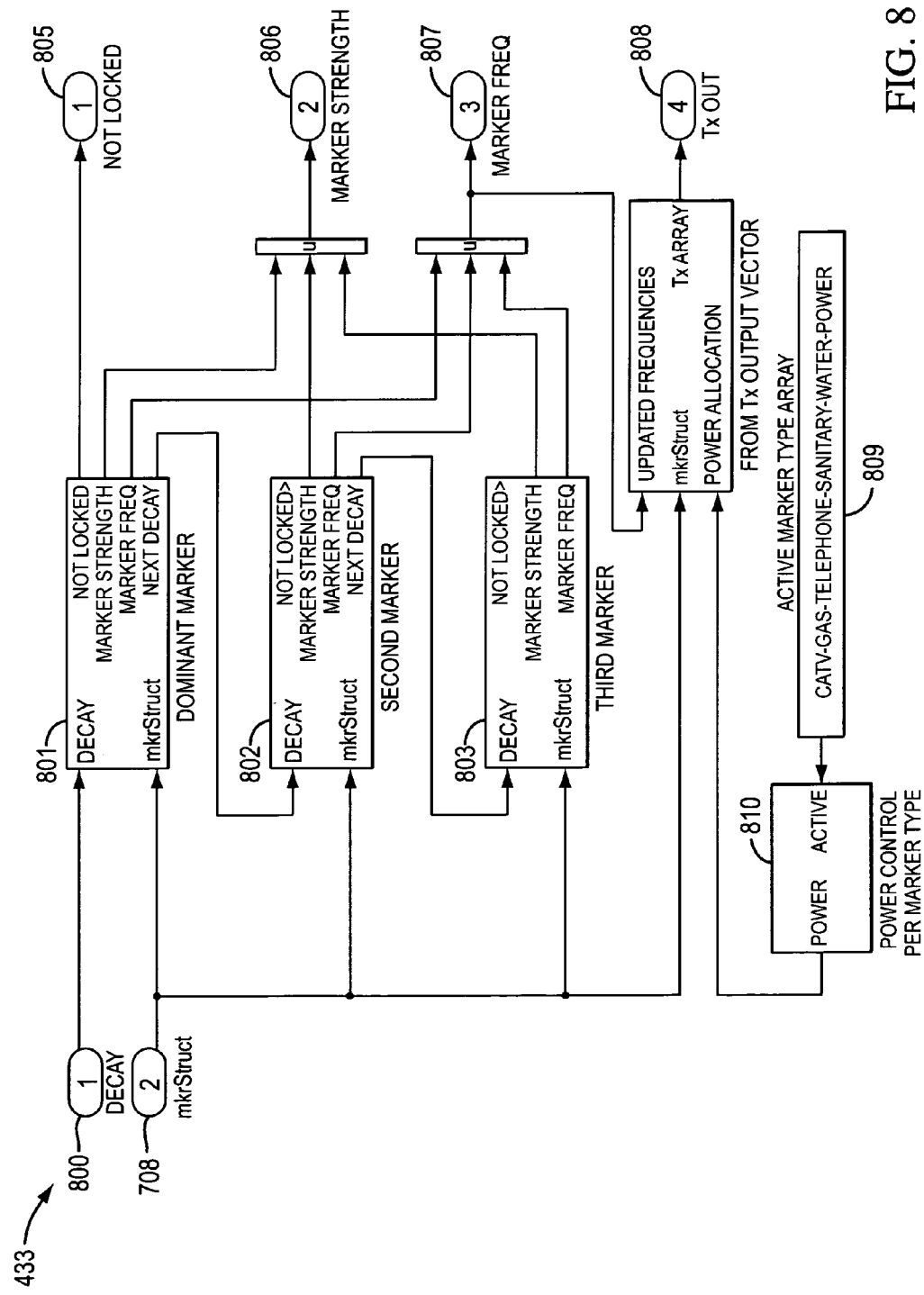
FIG. 8 shows a block diagram of an embodiment of a successive marker cancellation structure whereby detected marker types are sequentially removed from the averaged decay signal.

FIG. 8 shows an embodiment of detection DPLL 433. As shown in FIG. 4, detection DPLL 433 receives the average decay signal 605 from time average 430 into decay signal 800 and the marker structure signal 708 from marker searcher 431 into marker structure signal 708. A separate marker analysis block is utilized for each active marker recognized. In the embodiment shown in FIG. 8, the marker structure signal 708 and decay signal 800 are input to marker analysis block 801. Second and third markers are analyzed in marker analysis blocks 802 and 803, respectively. In general, there can be any number of marker analysis blocks included in detection DPLL 433 so that any number of markers can be simultaneously detected. For simple marker searches (when only one marker type is present), blocks 802 and 803 are inactive since marker structure 708 includes only one element.

Figure 14A:
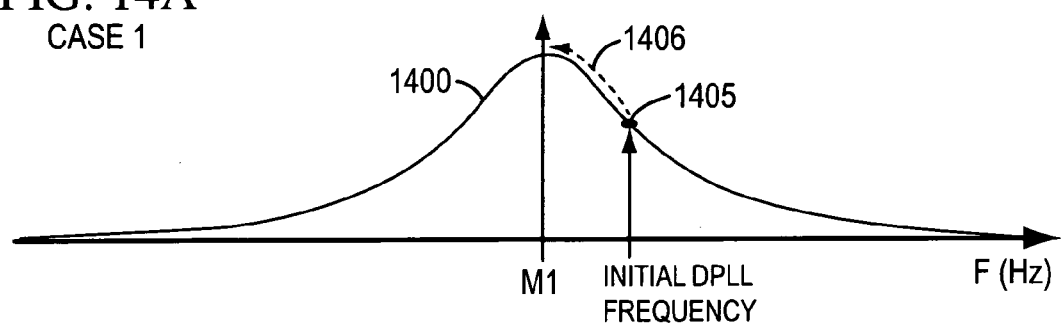
FIG. 14A, Case 1, illustrates a marker transfer function for scenarios in which only one active marker is present.

A representative detection problem for a simple case is illustrated by FIG. 14A (Case 1, trace 1400), which shows the marker M1 transfer function. FFT operation 702 leads to an initial determination that a single marker type exists and that the estimated marker frequency is at frequency 1405 on trace 1400. An error in the marker resonant frequency estimate may occur because of the fixed frequency resolution of the FFT. For such a simple single marker case there is no real advantage to using FFT 702 to predetermine the presence or absence of a marker. Marker analysis block 801 will just track to the single marker resonant frequency from any arbitrary starting frequency, even if frequency 1405 is unknown. However, as will be shown below, FFT 702 is important where successive detection (i.e., detection of more than one marker) is utilized. Therefore, in some embodiments FFT 702 is included for the analysis of simple cases as well.

Figure 9:
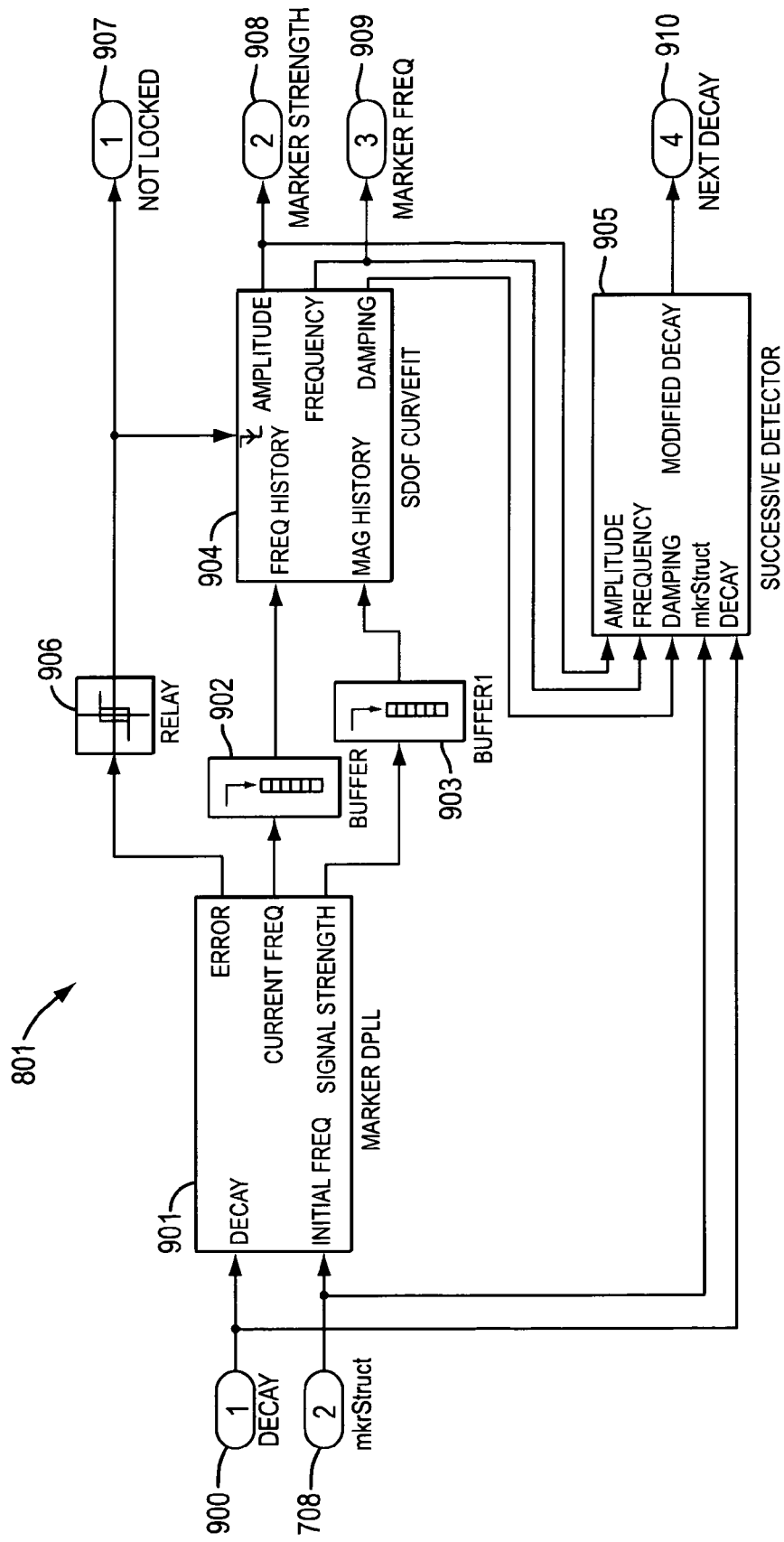
FIG. 9 shows a block diagram of an embodiment of a single-degree-of-freedom (SDOF) curvefit operation that can be invoked in a locked condition to create a modified decay for the next stage.

FIG. 9 shows a block diagram of an embodiment of marker analysis block 801, for example. Marker analysis blocks 802 and 803 (along with any other marker analysis blocks that may be present) can have the same or similar structure as that depicted in FIG. 9. In the embodiment of marker analysis block 801, decay signal 900 (which is decay signal 800 received in detection DPLL 433) and marker structure signal 708 is input to digital phase-locked loop (DPLL) 901. The initial frequency estimate 1405 (FIG. 14A) is taken from the frequency estimate provided in marker structure signal 708.

Figure 10:
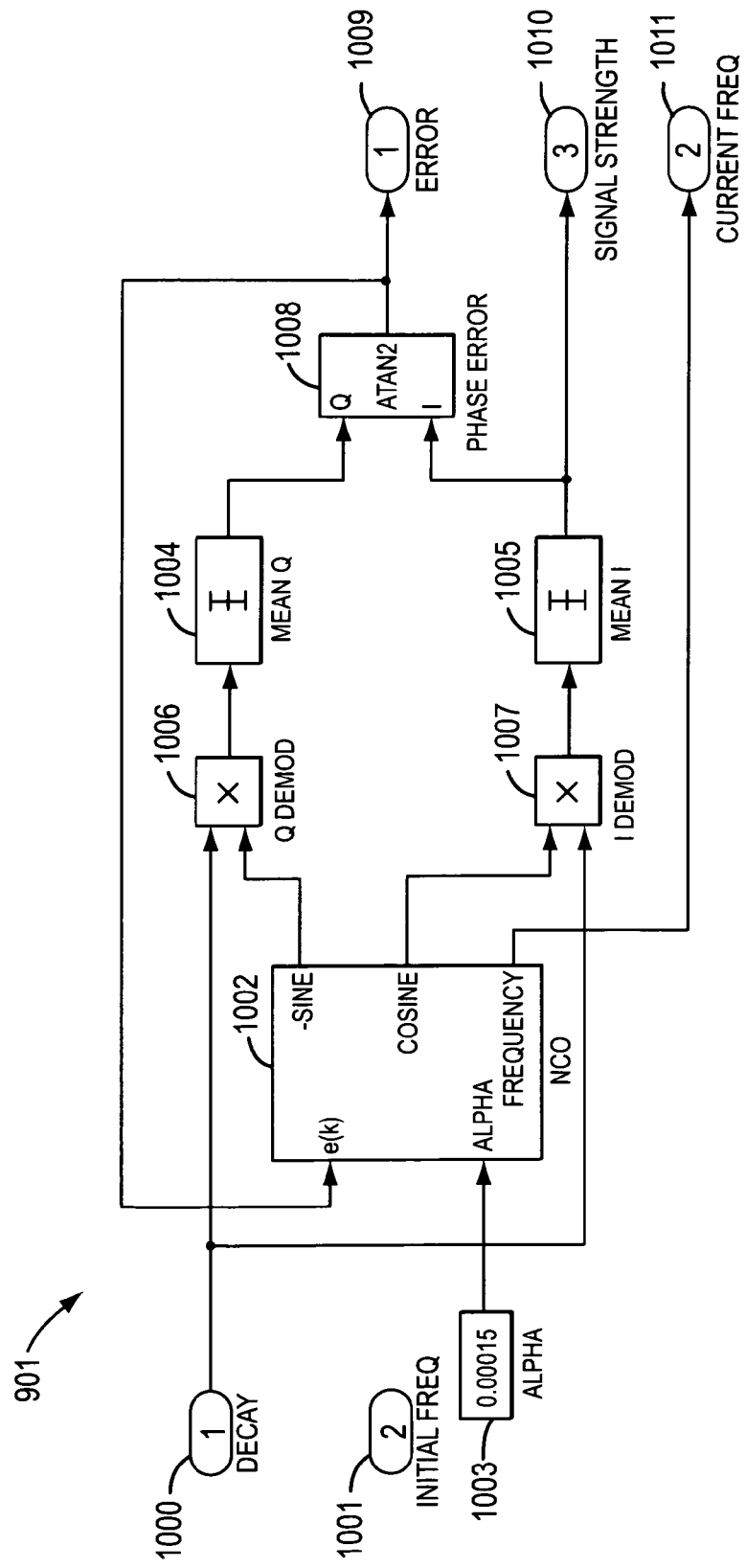
FIG. 10 shows a block diagram of an embodiment of a digital phase locked loop (DPLL) that can be used to update the marker frequency according to the present invention.

A block diagram of an embodiment of DPLL 901 is shown in FIG. 10. The embodiment of DPLL 901 illustrated in FIG. 10 is configured as a Costas Loop that relies on the phase error signal 1009 to act as the marker resonant frequency adaptation mechanism. The input decay sample 1000 (which, in marker analysis block 801 corresponds to decay signal 800) and the initial frequency read from marker structure signal 708 are input to numerically controlled oscillator (NCO) 1002. Because the input averaged decay signal 1000 is a block of samples, for example 500 samples, the numerically controlled oscillator (NCO) sine and cosine generation is performed over all samples at the same frequency (i.e., no frequency adaptation occurs inside of one decay signal block). The error signal 1009 is derived once per input block 1000 after quadrature multiplication 1006, in-phase multiplication 1007, filtering operations 1004 and 1005 that computes the mean value over all samples in the block, and an inverse tangent operation 1008 to compute the phase angle. In the embodiment shown in FIG. 10, DPLL 901 generates one error signal per averaged decay input 1000, so that the next set of transmit pulses has a shifted frequency according to the adaptation process. Once the frequency has converged to substantially the natural frequency of the marker, the error term becomes effectively zero. At lock, the quadrature component of the Costas Loop (Q) goes to zero and the inphase component (I) is taken as the marker signal strength 1010.

Figure 11:
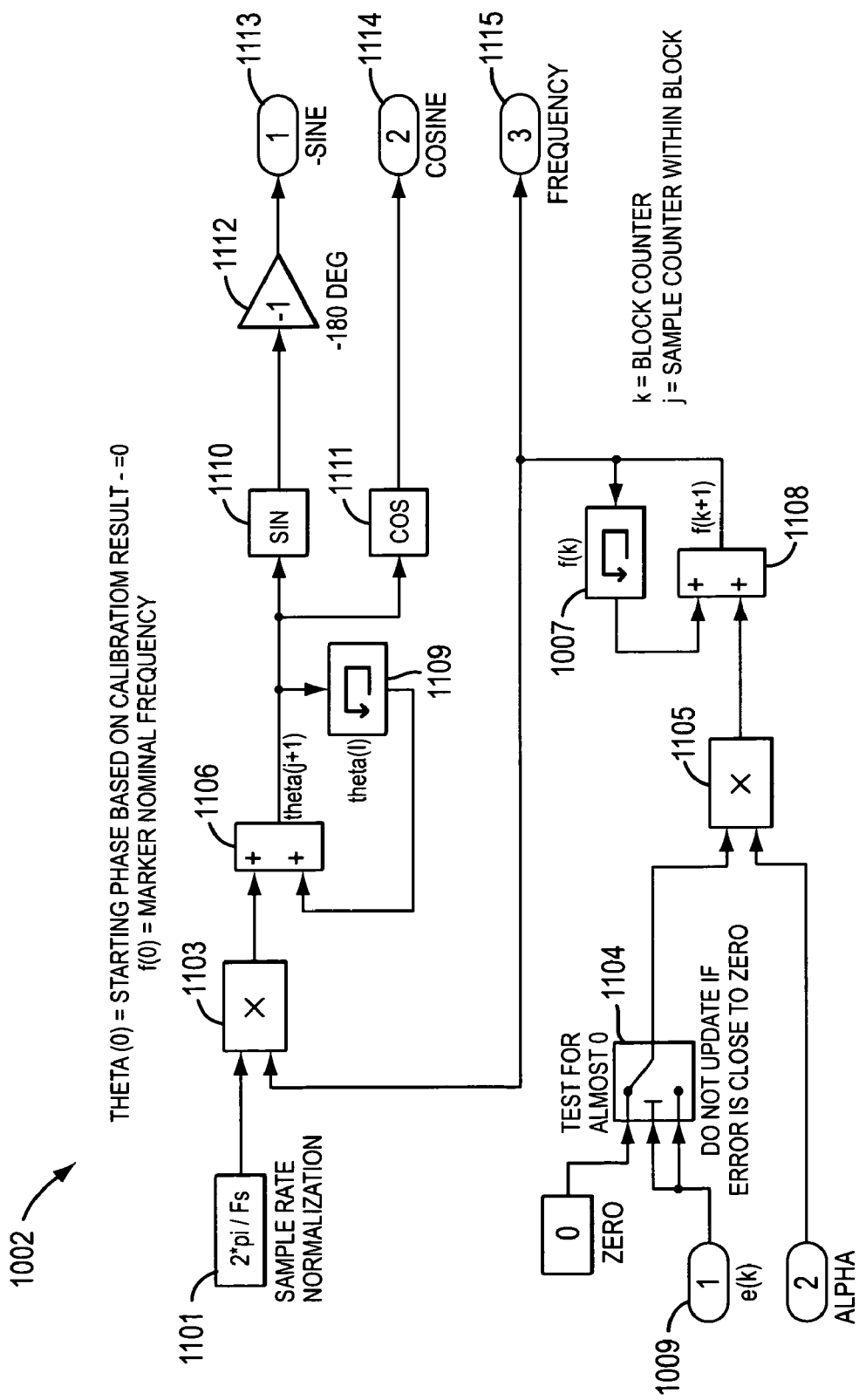
FIG. 11 shows a block diagram of an embodiment of a first order numerically controlled oscillator (NCO) of a DPLL such as that shown in FIG. 10, according to the present invention.

The actual frequency adaptation occurs in the NCO 1002, which results in a new current frequency 1011 for use in the transmitter output generation later. FIG. 11 shows the structure of NCO 1002, which only runs if error signal 1009 is not close to zero, as determined by test 1104. Before the lock condition, the NCO ramps the frequency according to the loop update equation:

$$f(k+1)=f(k)+\alpha e(k) \quad \text{(Equation 2)},$$

where f(k) and e(k) represent the frequency and phase error of the current decay block. Equation 2 is implemented by multipler 1105, summer 1008, and feedback 1107. The parameter α is the feedback coefficient and is selected in accordance with the pulse repetition rate and, for many systems, is about 0.00015.

The remainder of the first order NCO implements the equation $$\sin(\theta(k+1))=\sin(2\pi f \Delta t+\theta(k)) \quad \text{(Equation 3)}$$

for all the samples j residing in the input averaged decay signal. The sine and cosine blocks 1110 and 1111 in FIG. 11 can be replaced with corresponding lookup tables so that the real-time efficiency of NCO 1002 can be improved. Likewise, multipliers 1103 and 1105 can be implemented using fixed-point arithmetic processors for the same reason. Arithmetic issues are also important in the update of θ(k+1) in summer 1106 in FIG. 11. If the phase angle θ(k) were allowed to increment over the entire decay signal, the accuracy of NCO 1002 may suffer since a computer-based number system cannot represent unbounded numbers accurately. Thus, a practical implementation of NCO 1002 may include a modulo 2π circuit to control the growth of θ in summer 1106.

Amplifier 1112 provides a gain of −1 applied to the output signal from sine block 1110. Inverting the sine function creates negative feedback of the phase error term and thereby drives the system to a lock state. Although digital phase locked loops generally operate on a continuous stream of data, there are more than enough samples in the averaged decay signal 1000 to create a new estimate of phase error 1009.

When only a single marker type is present, there is no need for successive detection so block 904 (FIG. 9) can be skipped and output signals 908 and 909 are updated with the latest estimates of marker signal strength 1010 and marker frequency 1011 from marker DPLL 901.

To close the loop with the new frequency estimate, the next transmit output vector is created in block 804 (FIG. 8). This repeats the procedure described above with the additional option of implementing power control 810 on the individual marker excitation frequencies. The power control option will be further discussed below in the discussion of successive detection, but this is also where the user interface can specify the set of markers that are active 809.

The above discussion has illustrated the process of frequency adaptation for a simple single-marker scenario. Over repeated loops, the adaptation moves the current frequency along the transfer function curve 1406 (FIG. 14A), until the phase error is zero at which the current frequency is the marker resonant frequency. Even though the frequency updates only after a new averaged decay signal 605 is available, the pulse repetition rate (which, in some embodiments, is about 1000/sec) is high enough that the update occurs on the order of 10-20 times per second. With such a reduction in noise floor (100 averages represents a factor of 10 improvement in the SNR), as well as an appropriate choice for the feedback parameter α 1003, a rapid lock time to a newly detected marker is achievable. At lock, the marker is tracked until the phase error 1009 indicates that contact with that marker has been lost—for example when the operator has moved the marker locator out of range.

Figure 14B:
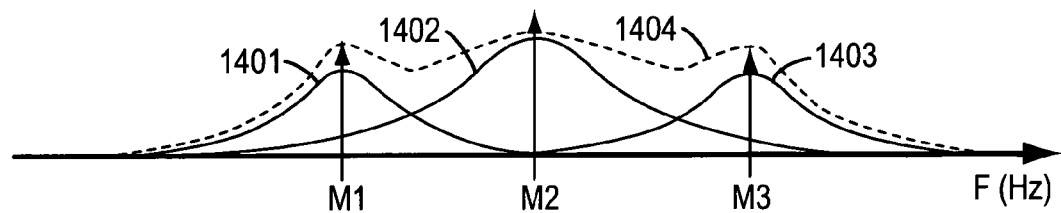
FIG. 14B, Case 2, illustrates a scenario in which three types of markers are present, and further where all types have approximately the same amplitude.

Successive cancellation detection can be utilized to positively decouple marker responses when the "neighbor detection" and the "near-far" problems are present. Prior art methods attempt to surmount the ambiguities by sequencing the marker locator transmitter pulse between the various marker frequencies to be searched. An example of the "neighbor detection" problem is illustrated in FIG. 14B, Case 2. In FIG. 14B, Case 2 is a situation in which three overlapping marker responses exist, so that at frequencies F1 and F3 marker M1 and M3 responses 1401 and 1403 are biased high as shown by combined response 1404, due to the presence of a marker M2 at frequency F2. Similarly response 1402 is biased by the resonant responses of markers M1 and M3 at frequencies F1 and F3, respectively, to stimulus frequencies F1 and F3 that decay at natural frequency F2 due to the frequency response of marker M2. These biases will cause errors in the marker depth estimates. Even if the locator sequences three successive transmitter pulses having separate single frequency stimuli—F1, F2, and F3—the same bias will result in the signal strength measurements. It is important to note that during the decay after the interruption of the transmitter burst, the response of the marker M1 at frequency F1 to stimulus F2 is a decaying time envelop at frequency F1 and initial amplitude equal to the M1 marker transfer function at frequency F2.

Successive cancellation is a mechanism to remove the ambiguity of whether adjacent markers are present which can either bias the magnitude response of a targeted marker, or obscure its detection altogether. The following description illustrates an embodiment of a method of cancellation according to the present invention. Beginning with simultaneous transmission of a superposition of three stimulus frequencies (F1, F2, F3, all equal in amplitude), and the subsequent acquisition of the averaged decay block 605 (as before), successive detection begins with the marker search process 431, which is illustrated in FIG. 7. In the case illustrated in FIG. 14B, the result of FFT 702 can be utilized to estimate the relative magnitudes of the marker signal at each of the three nominal marker frequencies. If nominal marker frequencies adjacent to the targeted marker are determined to have significant responses that stand out from the noise, marker structure signal 708 is initialized with each suspected marker type, including the initial frequency and phase that result from the linear FPT analysis of FFT 702. The FFT signal from FFT 702 is also useful to determine the difference in the relative amplitudes, which for Case 2 (FIG. 14B) will show three marker types, or at least a broad region of reflected energy that most likely results from a condition that multiple marker types are present within the frequency region from F1 to F3.

Detection DPLL 433, which is further illustrated in FIGS. 8, 9, 10, and 11 implements full successive detection mode, in that the output signals of the dominant marker detection block 801 is a modified decay envelope 910 generated by successive detector block 905, from which all responses attributable to the dominant marker have been removed from the signal. For Case 2, Marker M2 is anointed the dominant marker since the magnitude response is highest at frequency M2. Once the error converges to near zero for DPLL 901 (FIG. 9) relay 906 forces the "not locked" output 907 low, indicating to the rest of the system that a lock has been established on the dominant marker.

The transition in the system from "not locked" to "locked" state can also trigger the single degree of freedom (SDOF) curvefit operation performed in SDOF curvefit block 904. The system parameters of a SDOF system (as represented by the marker LC resonant circuit), can be determined from three measurable quantities: the amplitude, the resonant frequency $f$, and the 3 dB bandwidth of the response around the resonance ($\Delta f$). From these quantities can be determined the system equation, or equivalently the pole zero model of the system. The pertinent parameters for the present purpose of successive detection are the amplitude, frequency, and decay time constant $\tau$. For a SDOF system, a direct equivalency between $\tau$ and $\Delta f$ exists:

$$\tau = \frac{1}{\pi \cdot \Delta f} \quad \text{(Equation 4)}$$

To estimate $\Delta f$, two buffers 902 and 903 are accessed which contain the past history of amplitude and frequency values that preceded the lock condition. Each of those values represents the state of DPLL 901 over the same interval (say, for example 100 averages), so a smooth estimate of the marker response is analyzed to determine the 3 dB bandwidth. The only condition necessary for the $\Delta f$ calculation is that the oldest starting frequency in the buffer is sufficiently away from the resonant frequency that the amplitude values in the buffer differ by at least 3 dB. Even when this condition is not met, the DSP controller 420 can decide to hold off the lock condition for some moments and shift the transmit frequency in order to capture one more amplitude average so as to accomplish the SDOF curvefit operation (Equation 4).

Figure 12:
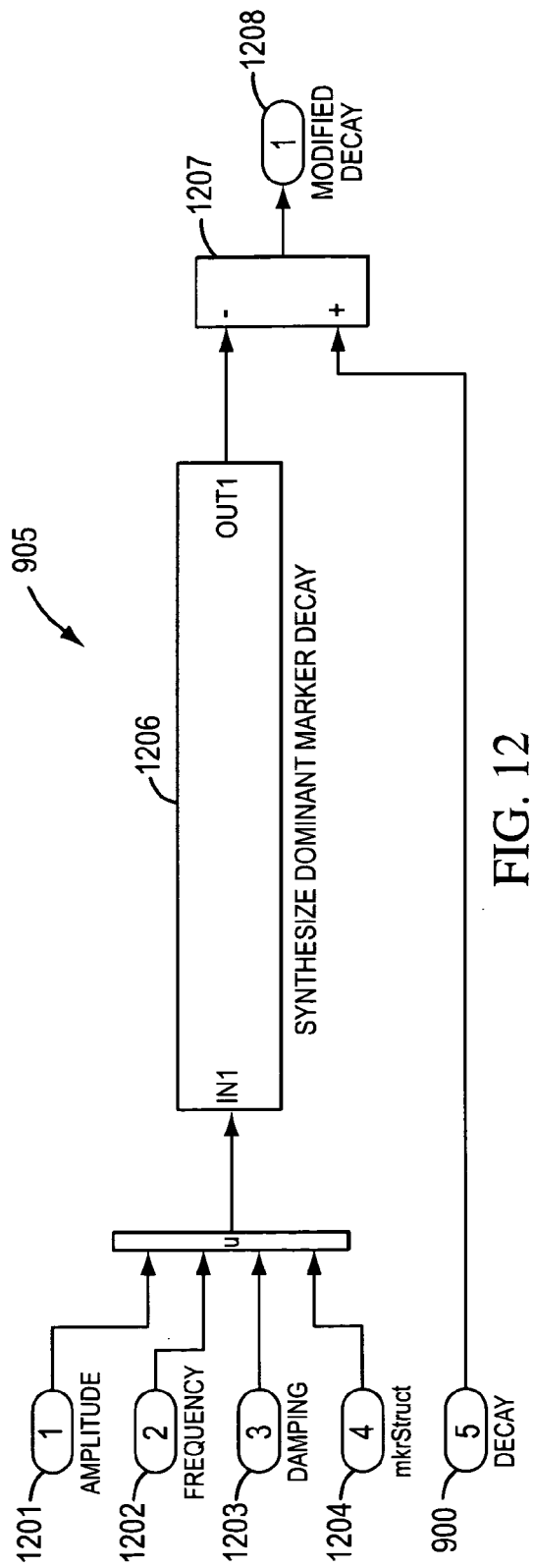
FIG. 12 shows a block diagram of an embodiment of a synthesis operation that takes as input the result of the SDOF curvefit shown in FIG. 9 and creates a synthesized time decay at the marker resonant frequency with starting phase zero.

The output signals from SDOF curvefit 904 include a set of parameters from which the time decay at frequency M2 can be synthesized in successive detection operation 905 (FIG. 12). Since averaged decay 900 is a set of time domain samples, synthesis operation 1206 creates a time domain block at the same sample-rate as decay 900. The starting phase of the synthesized block is zero (such as is the case for a frequency lock condition of DPLL 901), and the starting amplitude is as specified by amplitude signal 1201. The frequency of the synthesized block is fixed for the duration, and is substantially the resonant frequency of the marker at frequency F1. After subtraction 1207 the resulting modified decay 1208 is effectively cleaned of the dominant marker response at frequency M2. The input signals amplitude 1201, frequency 1202, and damping 1203 are received from SDOF curvefit 904 while marker structure 1204 and decay 900 are received as input decay 900 and marker structure 708 to marker analyzer 801.

As might be noted by inspection of the marker magnitude responses in FIG. 14 (Case 2), it may be difficult to achieve a lock condition in the first DPLL 901. This can happen if the overlapped responses are very similar in amplitude, such that no clear dominant marker response can be determined. Another potential problem is that DPLL 901 does not converge, but that a marker center frequency error exists due to the fact that the zero of the aggregate phase of the time decay response is biased due to the presence of more than one marker (almost equal in return energy).

Figure 14C:
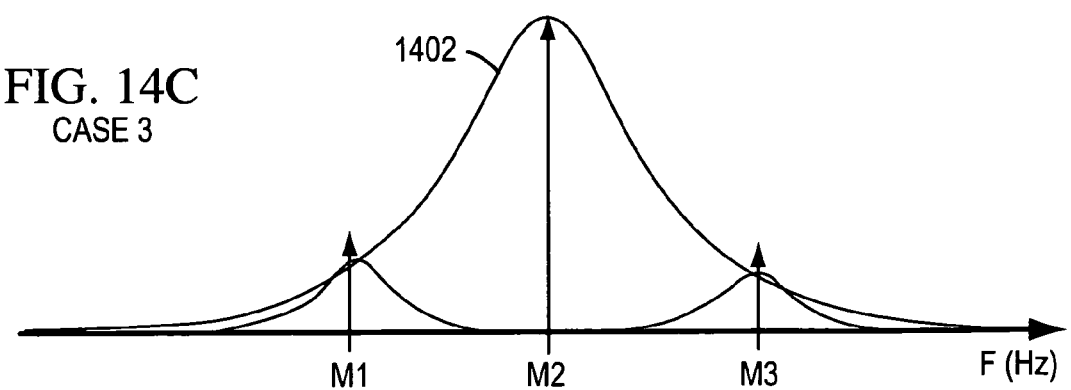
FIG. 14C, Case 3, illustrates an example of the same physical scenario as Case 2, but after a power control algorithm has increased the amplitude of marker type 2 relative to the other two types.

Therefore, in some embodiments power control of the individual markers can be accomplished. By adjusting the transmitted signal amplitude between the targeted marker type and the adjacent markers, a dominant marker frequency can be more clearly identified. FIG. 14C, Case 3, represents a scenario that could result for the same physical placement of three markers (relative to the marker locator) as for Case 2. But now the amplitude of the marker M2 stimulus frequency F2 has been increased relative to the other two frequencies F1 and F3. In some embodiments, the F1 and F3 amplitudes can be decreased somewhat, to keep the overall transmitter power output constant. In either case, through power control the probability of accurate detection of marker M2 has been enhanced at the expense of identifying markers M1 and M3. Furthermore the frequency error due to any aggregate phase bias in the decay response has been reduced. And even though the relative strength of markers M1 and M3 have been reduced, after successive cancellation of marker M2 the modified decay signal 910 has been more effectively cleaned of M2 signal components. Thus the probability of detection of the M1 and M3 markers has improved, in the sense that the M1 to M2 signal-to-interference noise ratio (SNR) has increased (and likewise for the M3 to M2 SNR). Thus, power control at the transmitter adds an effective mechanism for the marker locator to compose a signal by superposition that can stimulate an environment composed of multiple electronic markers (possibly having closely spaced frequencies) and can lead to increased probabilities of detection.

Figure 13:
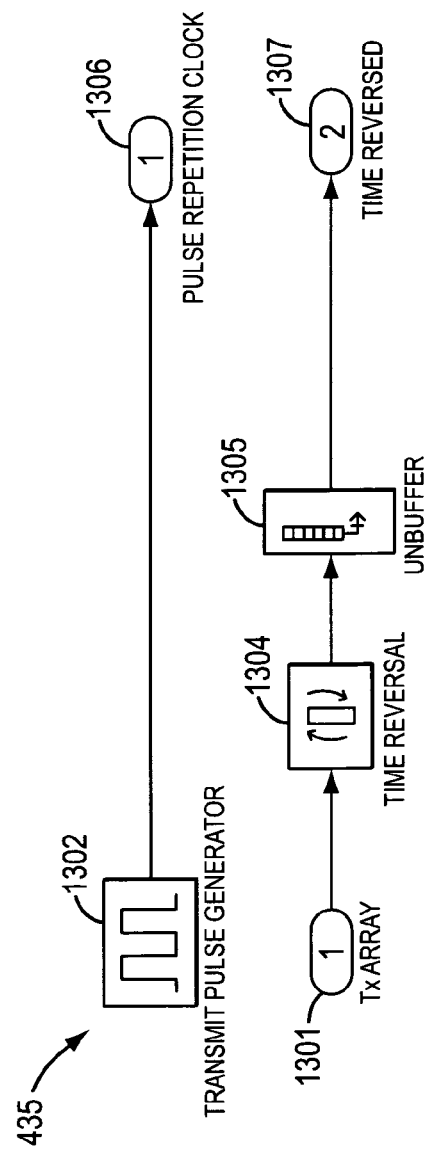
FIG. 13 shows a block diagram of a time reversal of the input signal, which can be a superposition of all active marker frequencies.

After the detection of the second marker M1 marker analysis block 802 (FIG. 8), and possibly the third marker M3 in marker analysis 803, after successive cancellation of the responses from both markers M1 and M2, power control algorithm 810 can adjust the amplitude of the next transmitter output 804 based on the factors described above. The superposition (addition of each signal) also occurs in transmitter output 804, as before using a reversed time method because of the necessity of creating a combined output block wherein each and every signal component results in a phase zero referred to ADC 430. To control the growth in amplitude of the last few samples before the zero phase reference point, the superposition method can optionally add each successive marker stimulus signal with either a 0° or 180° offset. Later, in the successive detection process at the output of the DPLL 901, the error 1009 is negated for those signals that were added with a 180° offset. Signal 808 represents the final transmit signal, which is passed to the transmitter buffer through switch 434 (FIG. 4). Processor 420 controls switch 434 to select calibration data 432, or the updated superposition of amplitudes and frequencies, based on the measurement state. FIG. 13 shows a diagram of the final stage before writing the buffer sample by sample to the output DAC 403. A time reversal 1304 (buffer direction swap) of the received transmit output signal 1301 and buffer 1305 is executed so that the phase zero point is appropriately aligned, and the pulse repetition clock is aligned at the buffer edges. A time reversed transmit output signal 1307 and a pulse repetition clock 1306, which is generated by transmit pulse generator 1302, are output by transmit output block 435.

The embodiments described herein are examples only of the invention. Other embodiments of the invention that are within the scope and spirit of this disclosure will be apparent to those skilled in the art from consideration of the specification and practice of the invention disclosed herein. It is intended that the specification and examples be considered as exemplary only and not limiting. The scope of the invention, therefore, is limited only by the following claims.

What is claimed is:

1. A marker locator, comprising:
   at least one transmitter channel coupled to provide a transmitter signal to an electromagnetic field generator, wherein the transmitter signal is phase shifted to provide a delay phase of substantially zero at the end of an electromagnetic pulse and is capable of exciting multiple types of markers;
   at least one receiver channel coupled to receive time decay signals from an electromagnetic field detector; and
   a digital processor coupled to provide digitized transmitter output signals to the at least one transmitter channel and to receive digitized time decay signals from the at least one receiver channel,
   wherein the digital processor receives the digitized time decay signals from the at least one receiver channel in the time interval between pulses of application of digitized transmitter output signals to the at least one transmitter channel, the averages the digitized time decay signals received from the at least one receiver channel, adapts the frequency of the averaged time decay signals, wherein the adapted frequency and the averaged time decay signals can assist in distinguishing between the multiple types of markers.

2. The locator of claim 1, wherein a pulse includes a first period where transmission of the transmitter signal from the electromagnetic field generator occurs and a second period where the time decay signal can be received.

3. The locator of claim 1, wherein the at least one transmitter channel includes a digital-to-analog converter coupled to receive a digitized transmitter output signal from the digital processor, a filter coupled to receive signals from the digital-to-analog converter, and a driver coupled to receive signals from the filter and provide the transmitter signal to the electromagnetic field generator.

4. The locator of claim 1,
   wherein the electromagnetic field generator and the electromagnetic field detector are an antenna, and
   wherein the at least one transmitter channel includes a transmit switch and the at least one receiver channel includes a receive switch, the transmit switch and the receive switch being controlled by the digital processor such that the at least one receiver channel does not receive the time decay signals while the at least one transmitter channel is coupled to the antenna and the at least one transmitter channel does not transmit the transmitter signal when the at least one receiver channel is coupled to the antenna.

5. The locator of claim 1, wherein the at least one receiver channel includes a filter coupled to an analog-to-digital converter, the filter coupled to the electromagnetic field detector to receive the time decay signals and the analog-to-digital converter coupled to the digital processor to provide digitized time decay signals.

6. The locator of claim 1, wherein the digital processor includes
   a time average that receives the digitized time decay signals from the at least one receiver channel, the digitized time decay signals indicating a signal decay as a function of time following a pulse of the transmitter signal to the at least one transmitter channel, the time average averaging signals over a predetermined number of time intervals between pulses to generate an average decay signal;
   a marker search that determines a marker structure from the average decay signal generated by the time average, the marker structure including parameters characterizing at least one marker that reflects signals detected by the electromagnetic field detector;
   a detection digital phase locked loop that receives the marker structure, separates a contribution from each of the at least one marker, determines marker parameters for each of the at least one marker, and generates a transmit array; and
   a marker transmit output that generates the digitized transmitter output signal of the pulse based on the transmit array and a pulse repetition clock.

7. The locator of claim 6, wherein the time average utilizes a linear averaging.

8. The locator of claim 6, wherein the time average utilizes an exponential averaging.

9. The locator of claim 6, wherein the time average comprises:
   a decay buffer that stores the digitized time decay signals received from the at least one receiver channel;
   a summer that adds the signals stored in the decay buffer so that an average is formed over a preselected number of pulses;
   a latch that latches that latches signals from the summer into an output buffer to provide the average decay signal; and
   a latch output that counts the number of pulses and latches the latch after receipt of the preselected number of pulses.

10. The locator of claim 6, wherein the time average comprises
    a plurality of decay buffers to store digitized time decay signals corresponding to a plurality of bits of data from at least one smart marker;
    a plurality of summers that add the signals stored in each of the plurality of decay buffers so that an average is formed over a preselected number of pulses;
    a plurality of latch outputs that latch signals from the summer into a plurality of output buffers to provide an average decay signal corresponding with each of the plurality of bits; and
    a plurality of latch outputs that counts the number of pulses and latches a corresponding one of the plurality of latch outputs after receipt of the preselected number of pulses.

11. The locator of claim 6, wherein the marker search comprises:
    a fast fourier transform that receives the average decay signal from the time average and provides a fast fourier transform signal of the average decay signal;

a marker determiner coupled to receive the fast fourier transform signal and generate a marker structure corresponding to parameters indicating each of at least one identified marker.

12. The locator of claim 11, wherein the marker structure can include the marker frequency, the marker amplitude, and the marker phase of the at least one identified marker.

13. The locator of claim 6, wherein the detection digital phase locked loop is coupled to receive the average decay signal and the marker structure, the digital phase locked loop comprising:
at least one marker analyzer coupled to generate a marker strength and marker frequency for a marker and further to remove the effects of that marker from the decay signal, each of the marker analyzers being coupled to receive a decay signal from a previously coupled digital phase locked loop with a first digital phase locked loop coupled to receive the averaged decay signal; and
a transmit output generator, the transmit output generator providing a transmit array for determining a digital transmit signal.

14. The locator of claim 13, wherein each of the marker analyzers includes:
a digital phase locked loop coupled to receive a decay signal and the marker structure, the digital phase locked loop converging on a current frequency and providing a signal strength, and an error signal corresponding to one marker indicated in the marker structure;
a SDOF curvefit coupled to receive the current frequency and signal strength and generate a marker strength and marker frequency; and
a successive detector generation coupled to receive signals from the SDOF curvefit, generate a marker response, and subtract the marker response from the decay signal to generate a new decay signal for processing by another one of the at least one marker analyzers.

15. A locator of claim 13, wherein the marker transmit outputs receives the transmit array and provides a time reversal to generate the digital transmit signal.

16. The locator of claim 15, wherein the digital transmit signal includes signals at frequencies centered around resonant frequencies of each of a plurality of markers.

17. The locator of claim 16, wherein the transmit array is arranged to have 0 phase shift for each of the resonant frequencies as measured at an input to the time average.

18. A marker locator, comprising:
means for generating pulses of a transmit signal from a frequency, field strength, and phase from one or more markers, wherein these pulses can excite multiple types of markers and each type of marker represents a different type of utility line, wherein generating the transmit signal includes:
determining one or more active markers,
determining a marker transmit signal to activate the one or more active markers from a frequency, field strength, and phase, wherein the marker transmit signal is phase shifted to provide a delay phase of substantially zero at the end of the electromagnetic pulse,
summing the marker transmit signal to form a digital transmit signal, and converting the digital transmit signal to form the transmit signal;
means for receiving signals from one or more markers between applications of the transmit signal;
means for averaging the received signals to form an average decay signal; means for determining the frequency, field strength, and phase of one or more markers from the average decay signal, wherein the determined frequency, the determined field strength, and the determined phase can assist in distinguishing between multiple types of markers.

19. The marker locator of claim 18, wherein the means for generating pulses includes
means for determining a marker transmit signal for at least one active marker; and
means for generating a digital transmit signal from the marker transmit signal for each of the at least one active marker.

20. The marker locator of claim 19, wherein the means for determining the marker transmit signal includes a means for adjusting a power of the marker transmit signal for each of the at least one active marker.

21. A marker locator, comprising:
at least one transmitter channel coupled to provide a transmitter signal to an electromagnetic field generator, wherein the transmitter signal is phase shifted and is capable of exciting multiple types of markers;
at least one receiver channel coupled to receive time decay signals from an electromagnetic field detector; and
a digital processor coupled to provide digitized transmitter output signals to the at least one transmitter channel and to receive digitized time decay signals from the at least one receiver channel,
wherein the digital processor receives the digitized time decay signals from the at least one receiver channel in the time interval between pulses of application of digitized transmitter output signals to the at least one transmitter channel, the averages the digitized time decay signals received from the at least one receiver channel, adapts the frequency of the averaged time decay signals, wherein the adapted frequency and the averaged time decay signals can assist in distinguishing between the multiple types of markers, wherein the digital processor includes:
a time average that receives the digitized time decay signals from the at least one receiver channel, the digitized time decay signals indicating a signal decay as a function of time following a pulse of the transmitter signal to the at least one transmitter channel, the time average averaging signals over a predetermined number of time intervals between pulses to generate an average decay signal,
a marker search that determines a marker structure from the average decay signal generated by the time average, the marker structure including parameters characterizing at least one marker that reflects signals detected by the electromagnetic field detector,
a detection digital phase locked loop that receives the marker structure, separates a contribution from each of the at least one marker, determines marker parameters for each of the at least one marker, and generates a transmit array, and
a marker transmit output that generates the digitized transmitter output signal of the pulse based on the transmit array and a pulse repetition clock.

* * * * *

UNITED STATES PATENT AND TRADEMARK OFFICE
CERTIFICATE OF CORRECTION

PATENT NO. : 7,358,738 B2  
APPLICATION NO. : 11/590267  
DATED : April 15, 2008  
INVENTOR(S) : Johan D. Overby et al.

Page 1 of 1

It is certified that error appears in the above-identified patent and that said Letters Patent is hereby corrected as shown below:

In claim 9, column 20, line 40, delete second instance of "that latches".

Signed and Sealed this

First Day of July, 2008

JON W. DUDAS  
*Director of the United States Patent and Trademark Office*